(No Model.)
S. W. RAVENEL.
DEVICE FOR MEASURING LAND.
No. 563,410. Patented July 7, 1896.
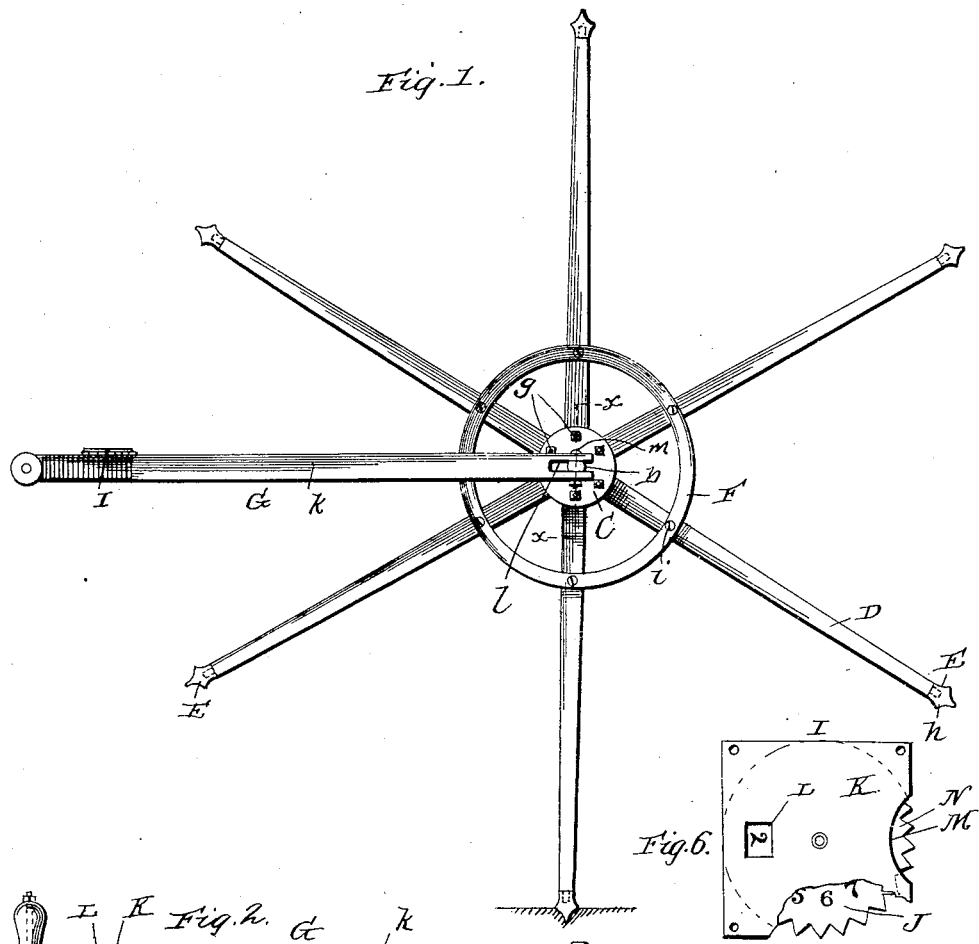
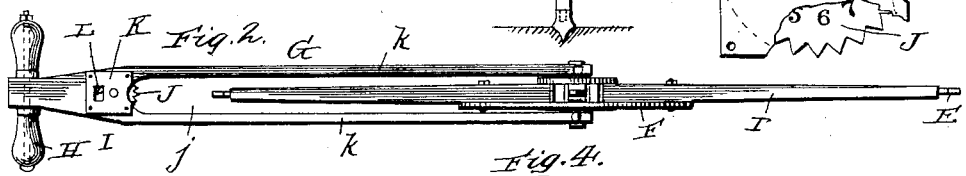
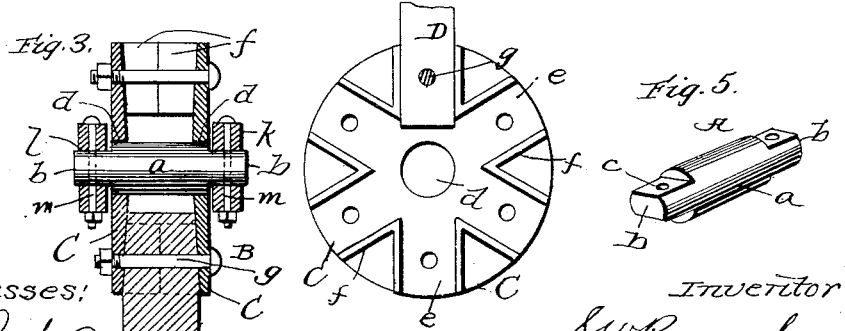

UNITED STATES PATENT OFFICE.

SAMUEL W. RAVENEL, OF BOONVILLE, MISSOURI.

DEVICE FOR MEASURING LAND.

SPECIFICATION forming part of Letters Patent No. 563,410, dated July 7, 1896.

Application filed October 7, 1895. Serial No. 564,924. (No model.)

*To all whom it may concern:*

Be it known that I, SAMUEL W. RAVENEL, a citizen of the United States, residing at Boonville, in the county of Cooper and State of Missouri, have invented certain new and useful Improvements in Devices for Measuring Land; and I do declare the following to be a full, clear, and exact description of the invention, such as will enable others skilled in the art to which it appertains to make and use the same.

This invention relates to a device for measuring land, and it has for its object to provide a device at a minimum expense which can be used by any farmer or other person who can multiply and divide figures to measure the acreage of his fields, or any distance in feet, chains, or miles, as accurately as a surveyor with his chain and compass, the person manipulating the device unaided and alone, thereby saving the time of some one holding one end of a tape or chain, the operator simply counting as each leg or branch of the compass strikes the ground, just as he would count each step in walking, and he is not as liable to miss a count as if he were using a tape or chain, as ordinarily practiced by surveyors.

The invention will be fully understood from the following description and claims, when taken in connection with the annexed drawings, in which—

Figure 1 is a side elevation of my improved device, which I shall denominate a "land-compass." Fig. 2 is a plan view of the same. Fig. 3 is a sectional detail view taken in the plane indicated by the line $x$ $x$ on Fig. 1. Fig. 4 is a view of one of the castings forming the hub, with a part of one spoke or branch of the compass therein. Fig. 5 is a perspective view of the axle removed; and Fig. 6 is a plan view of the indicator with the top plate partly broken away, so as to expose the toothed disk.

Referring by letter to said drawings, A indicates the axle, which may be formed of metal or other suitable material, and has its trunk or body portion $a$ round or circular in cross-section, and its ends terminate in angular or flattened portions $b$, each having a transverse hole $c$ therein.

B indicates the hub. This hub comprises two castings C, each of which is provided with an aligned aperture $d$, to receive the cylindrical or circular portion $a$ of the axle, and on their inner sides these castings are provided with radial grooves $e$, formed by the flanges $f$, to receive and seat the inner ends of the arms or branches D. These arms or branches D may be formed of wood or other suitable material, and are seated at their inner ends within the grooves $e$, where they are secured by means of transverse bolts $g$ and nuts or other suitable fastening devices. These bolts and nuts also secure the two sections of the hub together, as shown. The arms or branches D are provided at their outer ends with tips or ferrules E. These ferrules have a socket to receive the arms, and said ferrules have shoulders $h$ to limit their entrance into the earth, and thereby prevent them from passing too deeply into the same. Arranged concentrically around each hub-section is a ring F, which is designed to strengthen the position of the arms or branches. These rings are secured to said arms by means of bolts $i$ or the like, which take through holes in said rings and aligned holes in the spokes.

G indicates the handle or shaft. This handle is forked or bifurcated, as shown at $j$, and the inner ends of its branches $k$ are also forked or bifurcated, as shown at $l$, where they receive the flattened or angular portions $b$ of the axle, and said forked ends are provided with transverse holes to register with the holes $c$ in the ends of the axle and receive a bolt $m$, or the like, to secure the shaft to said axle, the hub of the device turning freely upon the axle. The shaft or handle is provided at its outer end with a cross-bar to form a convenient hand-grasp H, and on the upper side of the shaft, adjacent to the handle or contiguous to the forked portion, is a register I, designed to keep an accurate account of the number of times the arms or branches of the compass have been brought into use.

The register I comprises a disk J, of suitable size, having a toothed periphery, as shown, and this disk is provided on its upper side and in a circular manner with numbers, which may range from "1" to "20," or as high as may be desired. This disk is pivoted centrally to the under side of a covering-plate K, which latter is in turn secured to the shaft G, as shown, by means of screws or the like taking through corner-holes. This covering-plate is provided with a slot or sight-aperture L, through which the numbers on the rotatable disk J are exposed to view, and the said plate is preferably cut out in its forward edge, as shown at M, so as to expose the teeth N of said disk and allow them to project into the fork of the handle so, that they may be moved by the hand of the operator. The branches or legs of this rotary compass have been so accurately calculated and set that there are just 4,839.9849 or approximately four thousand eight hundred and forty compasses square in an acre, and by a "compass" I mean the distance from the ferrule on one leg or branch to that of another. Of course the legs or branches may be set for different calculations, but in the one I have given it will be seen that by dividing the area in compasses by 4,839.9849 if an exact result is desired, or by four thousand eight hundred and forty if an approximate result is desired, the quotient will show the acres in the field or fractions thereof. 69.57 compasses make one acre.

As an example, multiply the average width of a field by its average length in compasses and divide the result by 4,839.9849 or four thousand eight hundred and forty and you will have the approximate number of acres in the piece. Measure off 69.57 compasses each way and you have one acre.

To cut any given number of acres off a field, multiply four thousand eight hundred and forty by the number of acres to be cut off, then divide the result by the number of compasses across the field from which the piece is to be cut off, and the result will be the number of compasses to cut off. For example, you have a field six hundred and three compasses wide, from which you wish to cut off twenty acres. Multiply four thousand eight hundred and forty by twenty, which equals ninety-six thousand eight hundred. Then divide ninety-six thousand eight hundred by six hundred and three, which equals 160.53 compasses, which is practically 160.50 compasses, the number of the compasses off the end of the field required to make twenty acres. To measure a mile with the instrument, run off seventeen hundred and sixty compasses. Twenty-two compasses make one surveyor's chain. As before stated, there are exactly 4,839.9849 or approximately four thousand eight hundred and forty compasses square in an acre, and from this it will be observed that all calculations into which the number four thousand eight hundred and forty enters are but approximate.

The register is intended to be operated so as to register each hundred compasses, so as to save confusion. If it is desired to run chains, the register should be moved one number for every twenty-two compasses.

Having described my invention, what I claim is—

1. The land-measuring implement described comprising the hub composed of the two castings having the radial grooves on their inner sides and a central aperture, the axle having its central portion round or circular, and its ends flattened or of an angular form and provided with holes, the spokes arranged in the grooves of the hub and provided with the tips or ferrules at their outer ends, and the bolts and nuts securing said spokes, the handle carrying a register and forked with its branches also forked and provided with holes and the forked branches receiving the angular or flattened ends of the axle, and bolts for securing said parts together, and the rings arranged concentrically with respect to the hub and secured to the spokes, substantially as specified.

2. A land-marking device comprising a rotatable compass having its legs or branches fixed at predetermined distances from each other and provided at their ends with ferrules having shoulders $h$, and a handle carrying the rotatable compass and also carrying a register, substantially as and for the purpose set forth.

In testimony whereof I affix my signature in presence of two witnesses.

SAMUEL W. RAVENEL.

Witnesses:
W. G. PENDLETON,
JAS. NICHOLSON.